United States Patent
Ishibashi et al.

(12)
(10) Patent No.: US 6,215,461 B1
(45) Date of Patent: Apr. 10, 2001

(54) IMAGE VIEWING SYSTEM AND IMAGE DISPLAY DEVICE

(75) Inventors: Kenji Ishibashi, Izumi; Yasushi Kobayashi, Moriguchi; Yasumasa Sugihara, Hashimoto; Yasushi Tanijiri; Hideki Nagata, both of Sakai, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 08/919,396

(22) Filed: Aug. 28, 1997

(30) Foreign Application Priority Data

Aug. 30, 1996 (JP) .................................................... 8-229764

(51) Int. Cl.<sup>7</sup> ...................................................... G09G 5/00
(52) U.S. Cl. .................................. 345/8; 348/39; 348/53
(58) Field of Search .............................. 354/211; 434/38; 348/77, 39, 53; 345/7, 8, 9; 359/630

(56) References Cited

U.S. PATENT DOCUMENTS 5,200,827 * 4/1993 Hanson et al. ...................... 354/211
5,388,990   2/1995 Beckman ............................... 434/38
5,491,510   2/1996 Gove ..................................... 348/77

FOREIGN PATENT DOCUMENTS 57-121487   7/1982 (JP) .
 3-56923    3/1991 (JP) .

* cited by examiner

Primary Examiner—Steven J. Saras
Assistant Examiner—Srilakshmi K. Kumar
(74) Attorney, Agent, or Firm—Sidley & Austin (57) ABSTRACT

The object is to provide an image viewing system that allows easy image viewing with reduced eyestrain, whether for wide-angle or enlarged viewing. The rotation of the viewer's head is detected by means of piezo-electric vibration gyroscopes 405 and 406, and the coefficient for setting the amount of change in the camera system's image shooting direction with reference to the detected direction is changed in accordance with the focal length of the camera system's zoom lens systems. Moreover, the amount of change in the image shooting direction may be changed manually by means of sensitivity setting lever 213 mounted on HMD 2.

28 Claims, 6 Drawing Sheets

IMAGE VIEWING SYSTEM AND IMAGE DISPLAY DEVICE

BACKGROUND OF THE INVENTION

1. Field of the Invention

The present invention pertains to an image viewing system that comprises an image display device that displays an image in front of a viewer's eyes while the device is either mounted on the viewer's head or held in front of the viewer's eyes, as well as a device that supplies the image to the image display device, and more particularly to an image viewing system that displays an image corresponding to the direction in which the viewer is looking.

2. Description of the Related Art

As an image viewing system, a system has been proposed that permits by means of a three-dimensional viewing device comprising, for example , a pair of left and right display units, viewing of an image shot by a three-dimensional camera system comprising a pair of left and right cameras. For example, in Japanese Laid Open Patent No. SHO 57-121487, an image display device mounted on the head (head mounted display, abbreviated as "HMD" below) changes the direction of image shooting of a three-dimensional camera system in accordance with the direction in which the viewer is looking. In these devices, because the direction of image shooting of the three-dimensional camera system is set in accordance with the detected direction of viewing, images may be viewed that are as realistic as if the viewer were present where the cameras are located.

However, where the direction of image shooting is set simply based on the viewing direction, if the object desired to be shot is located behind the viewer, for example, in order to look at it, the viewer must turn completely around. If the object is above the viewer, the viewer must look overhead, which, where the viewer desires to view the object for a long time, is uncomfortable and causes eyestrain and disorientation in the viewer.

Where the object is viewed in enlargement, because the focal length of the cameras' lens systems used for image shooting is set to a long focal length, the displayed image changes considerably in response to a slight change in the direction of image shooting that results from a change in the direction of viewing, which makes it difficult to set the direction of viewing. In addition, because even a slight change in the direction of viewing results in a substantial change in the displayed image, the problem occurs that the target object is lost from view.

SUMMARY OF THE INVENTION

The present invention was made in order to resolve the problems described above. An object is to provide an image viewing system and image display device that reduce eyestrain on the part of the viewer and permit easy image viewing regardless of whether wide-angle or enlarged viewing is performed.

In order to attain said object, the image viewing system of the present invention is an image viewing system that displays an image that corresponds to the direction in which a viewer is looking, and comprises a display device that displays the image to be viewed; a viewing direction detector that detects the direction in which the viewer is looking; a display direction setting device that sets the display direction in accordance with the direction detected by said viewing direction detector; an image generator that outputs the image for the set direction to the display device; and a changing device that changes sensitivity when the display direction is set by said display direction setting device.

Another image viewing system of the present invention is an image viewing system that displays an image that corresponds to the direction in which a viewer is looking, and comprises a display device that displays the image to be viewed; a viewing direction detector that detects the direction in which a viewer is looking; a display direction setting device that sets information about the image display direction so that the image pertaining to an image shooting direction corresponding to said detected direction is displayed on the display device; and a changing device that changes the sensitivity when the display direction is set by said display direction setting device.

An image display method of the present invention comprises following steps of: a step of detecting the direction in which the viewer is looking; a step of setting sensitivity of the detection based on a predetermined information; and a step of displaying the image for the detected direction.

With the construction and the method described above, the viewing direction in which the viewer is looking is detected, an image shooting direction corresponding to said direction is set, and the image for that direction is displayed, and the sensitivity, when the image shooting direction is set with reference to the direction of viewing, may be changed by a changing device.

BRIEF DESCRIPTION OF THE DRAWINGS

These and other objects and features of this invention will become clear from the following description, taken in conjunction with the preferred embodiments with reference to the accompanying drawings in which.

DETAILED DESCRIPTION OF THE PREFERRED EMBODIMENTS

Figure 1:
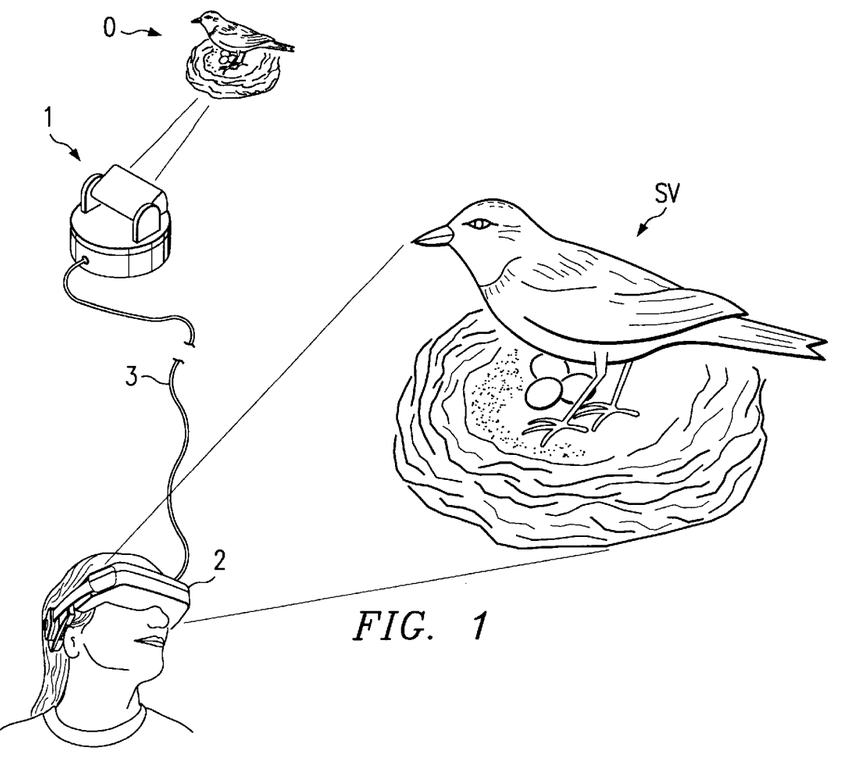
FIG. 1 is a drawing of the image viewing system forming an embodiment of the present invention.

FIG. 1 shows the construction of the entire image viewing system according to an embodiment of the present invention. The image viewing system will be explained referring to the drawing. The image viewing system comprises three-dimensional camera system 1 to shoot images of object O and HMD 2 for viewing the shot image SV. They are connected via cable 3 such that the image is transmitted. Three-dimensional camera system 1 has a pair of left and right cameras. HMD 2 has a pair of built-in left and right virtual image projecting devices that project virtual images such that the image that is shot by the left camera of three-dimensional camera system 1 is projected onto the left eye while the image that is shot by the right camera of three-dimensional camera system 1 is projected onto the right eye. Because images are shot and projected in this way, i.e., different images for the left and right eyes, the image of object O is supplied to the viewer as three-dimensional image SV.

Figure 2:
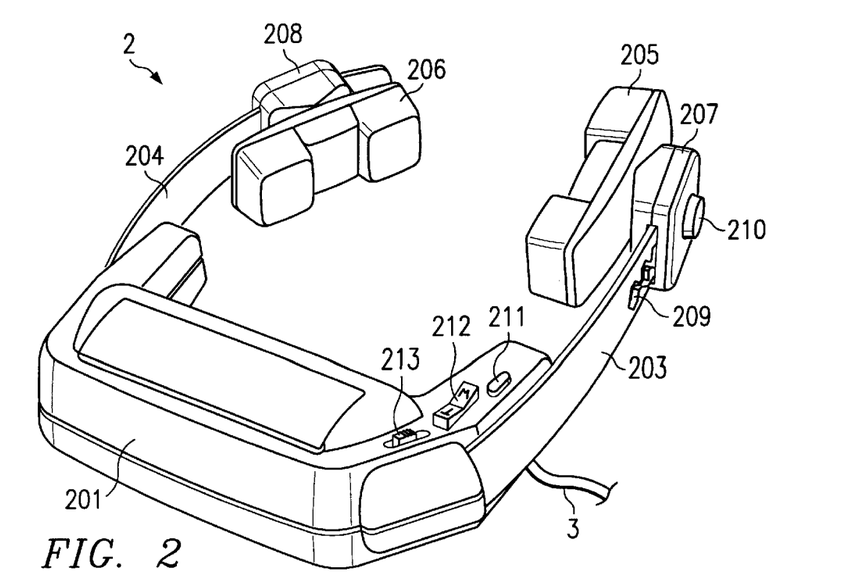
FIG. 2 is a perspective view showing the external appearance of an HMD used in the image viewing system.

FIG. 2 is a perspective view of HMD 2 used in the present system. 201 is a main unit housing that houses the projecting devices described below. Cable 3 for transmission and receipt of image signals and control signals to and from camera system 1 extends from the main unit. Support arms 203 and 204 extend backward from both ends of main unit housing 201. These support arms are formed of an elastic material and are given inward force such that they clamp over the head of the viewer. Head clamps 205 and 206 are placed on support arms 203 and 204, respectively, and are made movable by means of sliders 207 and 208. Because head clamps 205 and 206 are moved by means of moving sliders 207 and 208 along guide grooves 209 (the right side is not shown in the drawing) while pushing button 210, the main unit can be mounted firmly onto the viewer's head regardless of its size or shape. In addition, there is a nose cushion, not shown in the drawing, inside main unit housing 201, such that the weight of HMD 2 may be supported on the nose as well.

Start button 211 that begins control of HMD 2, zoom button 212 that performs zooming with regard to the viewed image, and sensitivity setting lever 213 that permits manual setting of the sensitivity with regard to the direction of viewing are located on the exterior of main unit housing 201.

Figure 3:
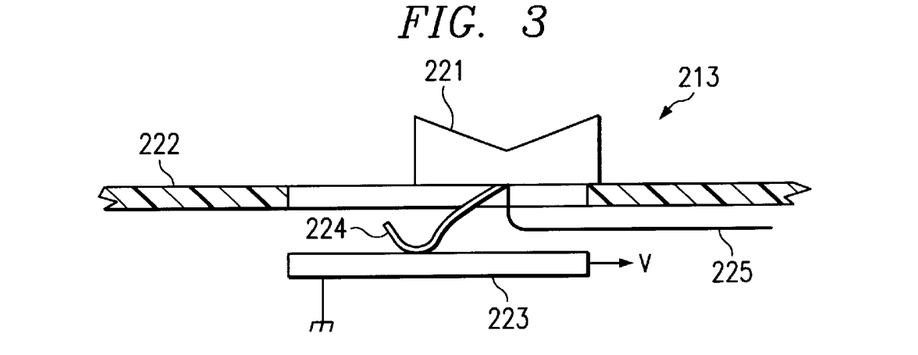
FIG. 3 is a drawing showing the construction of a sensitivity setting member mounted on the HMD.

Sensitivity setting lever 213 will now be explained below with reference to FIG. 3. 221 is a lever that is operated by the viewer, and 222 indicates a cross-section of main unit housing 201. 223 is a variable resistor formed on an electrical substrate that is fixed inside main unit housing 201, one terminal of which is grounded and the other of which is set to a prescribed voltage V(ex. 5 Volts). 224 is a conductive spring fixed to lever 221 such that it rubs against variable resistor 223 when lever 221 is moved. The electric potential at the contact point between variable resistor 223 and conductive spring 224 is input via signal line 225 to a controller described below, and a sensitivity of a prescribed level corresponding to the potential, i.e., the position of sensitivity setting lever 213, is set.

Figure 4:
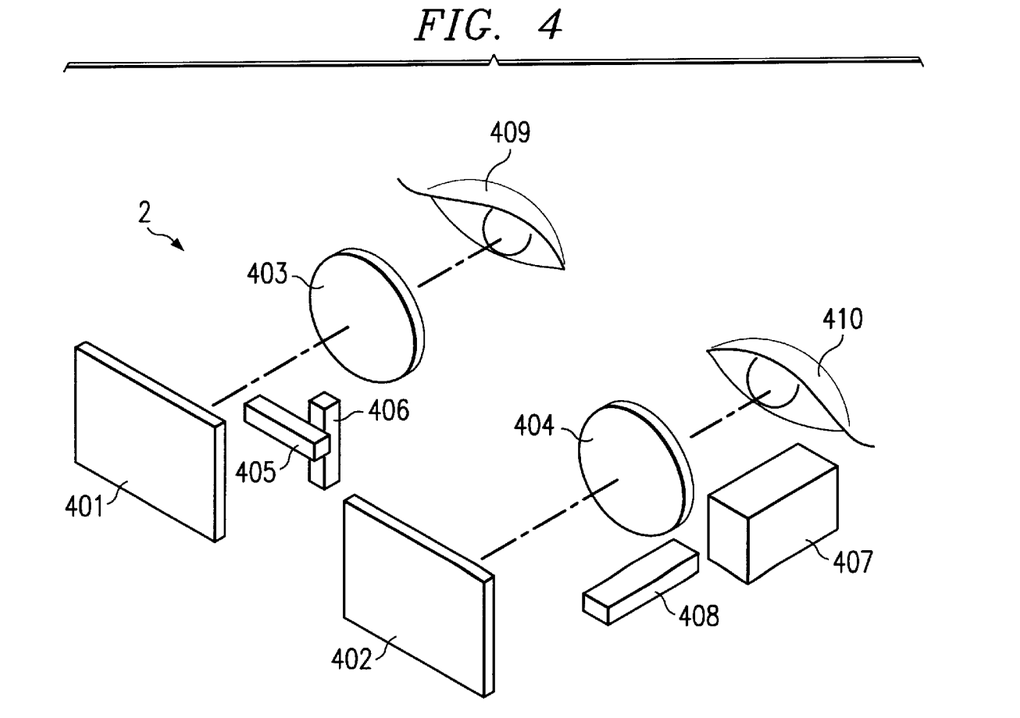
FIG. 4 is a simplified drawing of the internal construction of the HMD.

Next, the internal construction of HMD 2 will be explained with reference to FIG. 4. 401 and 402 are display elements (such as LCD elements) for displaying the image to the right and left eyes, respectively. 403 and 404 are eyepieces to form virtual images of the images from right and left LCD elements 401 and 402, and the formed virtual images are viewed by right eye 409 and left eye 410. 405 and 406 are piezoelectric vibration gyroscopes that detect movement of the head of the viewer to which HMD 2 is attached. Horizontally oriented piezoelectric vibration gyroscope 405 detects the speed of vertical rotation of the viewer's head, while vertically oriented piezoelectric vibration gyroscope 406 detects the speed of lateral rotation of the viewer's head. 407 is a zoom switching unit (212), and 408 is a sensitivity setting switching unit (213).

Figure 5A:
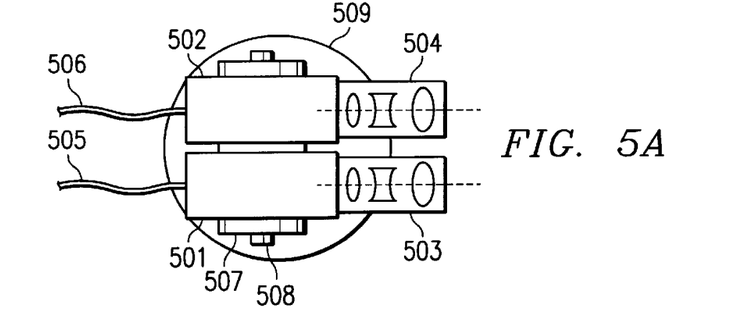
FIGS. 5(A) and 5(B) are simplified drawings showing the construction of the three-dimensional camera system used in the image viewing system.
Figure 5B:
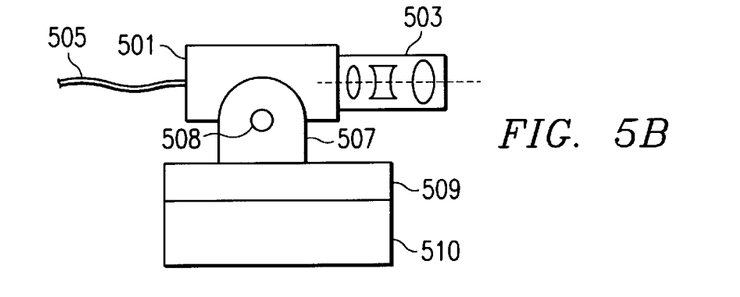

Next, the construction of three-dimensional camera system 1 will be explained with reference to the plan view shown in FIG. 5(A) and the side elevation shown in FIG. 5(B). 501 and 502 are left and right video cameras, to which zoom lens systems 503 and 504 are connected, respectively, and the images they shooting are sent to HMD 2 via signal lines 505 and 506, respectively. Motors not shown in the drawings are built into zoom lens systems 503 and 504 such that the focal lengths are changed in response to the operation of zoom button 212. If an automatic focus adjustment function is incorporated, a sharp image of the target object may be obtained at all times. Platform 507 supports shaft 508, to which left and right cameras 501 and 502 are integrally attached such that they may rotate upward and downward. The platform 507 is placed on rotary table 509 that is placed on fixed table 510 such that it may rotate laterally. The rotations of these members are performed using motors not shown in the drawings, said motors being controlled by a controller described below.

By means of the above construction, the direction of image shooting of the three-dimensional camera system may be adjusted upward and downward as well as to the left and right, and the image shooting magnification may be changed in response to the zooming operation.

Figure 6:
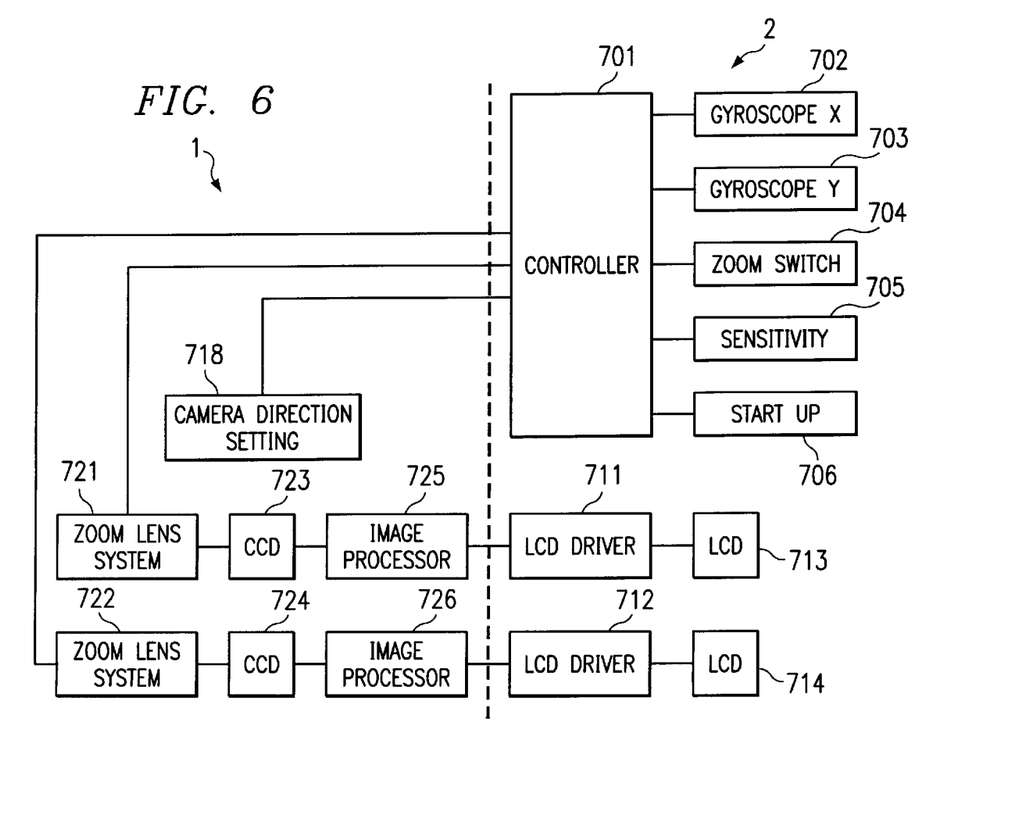
FIG. 6 is a block diagram of the circuit construction of the image viewing system.

Next, the circuit construction of the entire image viewing system of this embodiment will be explained with reference to FIG. 6. First, explaining from the side of HMD 2, 701 is a controller, for example a microcomputer chip, to perform control of the entire circuit by means of a program. Piezoelectric vibration gyroscope X 702 (406), piezoelectric vibration gyroscope Y 703 (405), zoom switching circuit 704 to detect the operation of zoom button 212, sensitivity setting circuit 705 to detect the operation of sensitivity setting lever 213, and startup switching circuit 706 to detect operation of startup button 211 are connected to controller 701, and signals from these circuits are input to controller 701.

Piezoelectric vibration gyroscope X 702 (406) detects lateral movement of the viewer's head, while piezoelectric vibration gyroscope Y 703 (405) detects vertical movement of the viewer's head. These piezoelectric vibration gyroscopes detect the angular speed of movement and output analog signals corresponding to the detected angular speed to controller 701. The analog signal corresponding to the angular speed that was input is converted into a digital signal by means of an A/D converter built into controller 701, and the amount of change in the direction of viewing is calculated by performing integration of this digital signal. Sensitivity setting circuit 705 detects the position of sensitivity setting lever 213 by means of the method described above and transmits an analog signal corresponding to this position to controller 701, which converts said analog signal into a digital signal by means of the A/D converter built into the controller, and sensitivity setting is performed based on this digital signal. LCD elements 713 and 714 (401 and 402) and LCD drive circuits 711 and 712 to drive LCD elements 713 and 714, respectively, are located inside HMD 2.

Explaining the circuit construction of camera system 1, zoom lens systems 721 and 722 (503, 504) that are equipped with zoom drive circuits may be moved together by means of vertical direction drive mechanisms 507 and 508 and lateral movement drive mechanisms 509 and 510 described above such that the direction they face is set. A directional signal is input to camera direction setting circuit 718 from controller 701 inside HMD 2, and the direction of image shooting performed by the camera system is set by controlling said drive mechanisms 507, 508, 509 and 510 in response to this signal. A signal sent from controller 701 in response to zooming operation is input to the zoom drive circuits of zoom lens systems 721 and 722, and zooming is performed based on this signal.

The object images shot through the zoom lens systems 721 and 722 are formed in CCD image pickup elements 723 and 724 and converted into electric signals, whereupon they are sent to image processing circuits 725 and 726, and prescribed signal processing is performed. The image signals are then sent to LCD drive circuits 711 and 712 located in HMD 2, then are transmitted to LCD elements 713 and 714 as signals that can be displayed by said elements, whereupon the image may be viewed.

Figure 7A:
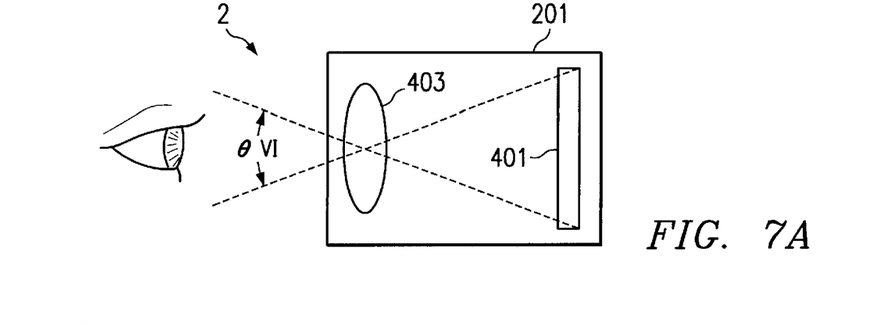
FIGS. 7(A) and 7(B) are drawings to explain the viewing angle in the HMD and the image shooting angle in the three-dimensional camera system.
Figure 7B:
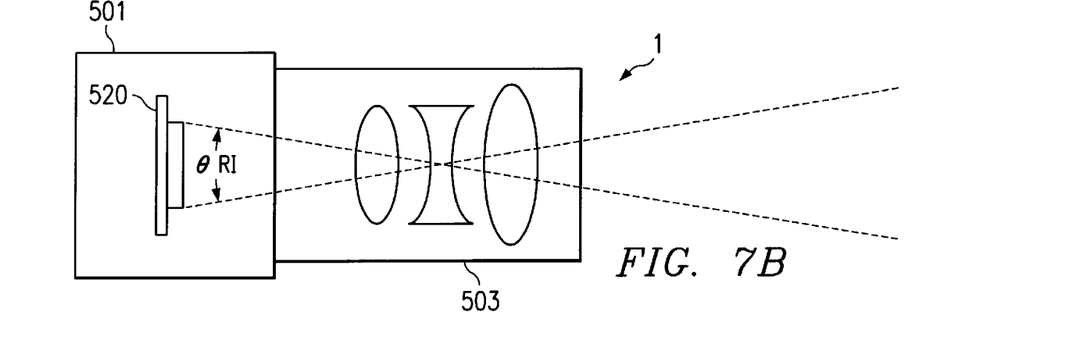

Next, setting of the direction of image shooting of the three dimensional camera system will be explained. The viewing angle in HMD 2 is shown in FIG. 7(A). The viewing angle used to see the image displayed on LCD device 401 and viewed through the eyepiece 403 is deemed viewing angle $\theta VI$. Image shooting angle $\theta RI$ used by camera system 1 is shown in FIG. 7(B). Image shooting angle $\theta RI$ is the angle of view regarding the image projected onto CCD 520 through the zoom lens system 503. If the focal length of zoom lens system 503 is set to a longer focal length via operation of the zoom button, image shooting angle $\theta RI$ decreases and the image magnification increases. In other words, the object is shot in considerable enlargement. Conversely, if zoom lens system 503 is set to a shorter focal length, image shooting angle $\theta RI$ increases and the image magnification decreases. In other words, a wide-angle image is shot.

Figure 8A:
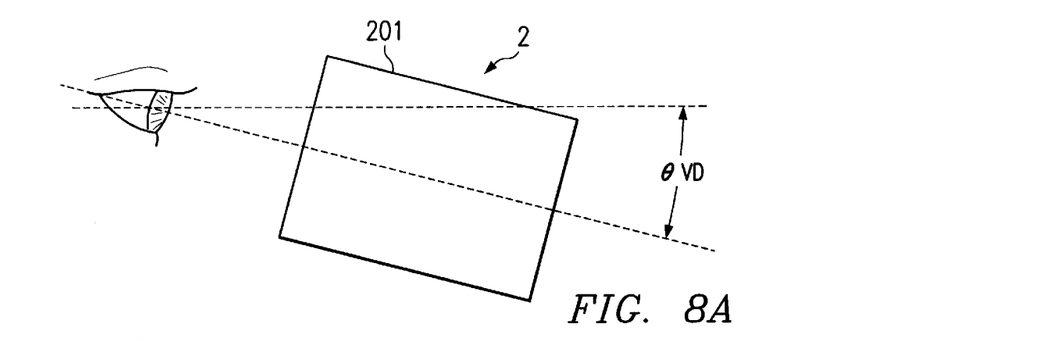
FIGS. 8(A) and 8(B) are drawings to explain the amount of change in the viewing angle in the HMD and the amount of change in the image shooting angle in the three-dimensional camera system.
Figure 8B:
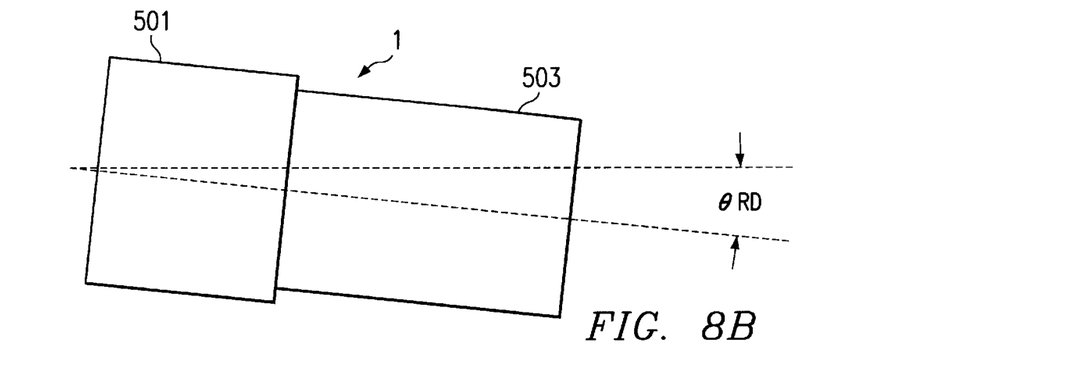

Next, the amount of change in the direction of viewing and the amount of change in the direction of image shooting will be explained. Amount of change $\theta VD$ in the viewer's viewing direction using HMD 2 is shown in FIG. 8(A). Amount of change $\theta RD$ in the direction of image shooting performed by camera system 1 is shown in FIG. 8(B). The drawings show the situation in which the HMD and the camera system go from looking straight ahead to looking downward.

Figure 9:
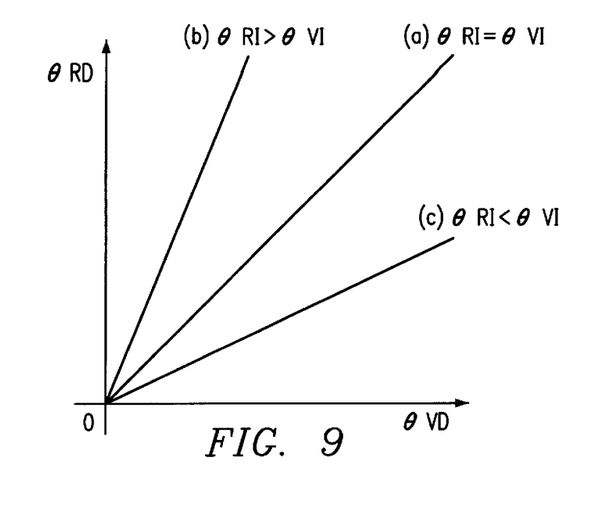
FIG. 9 is a drawing to explain the setting of the amount of change in the image shooting angle in the three-dimensional camera system with reference to the amount of change in the viewing angle in the HMD.

The setting of image shooting direction $\theta RD$ (vertical axis) relative to viewing direction $\theta VD$ (horizontal axis) is shown in FIG. 9. Where the image shooting angle equals the viewing angle (line (a), where $\theta RI=\theta VI$), the amount of change in the camera system's image shooting direction is set to be equal to the amount of change in the viewing direction. Where the image shooting angle is larger than the viewing angle (line (b), where $\theta RI>\theta VI$), the shot image magnification is small and wide-angle shooting is being performed. In this case, the amount of change in the camera system's image shooting direction is set to be larger than the amount of change in the viewing direction. Where the image shooting angle is smaller than the viewing angle (line (c), where $\theta RI<\theta VI$), the shot image magnification is large and narrow-angle (i.e., telephoto) image shooting is being performed. In this case, the amount of change in the camera system's image shooting direction is set to be smaller than the amount of change in the viewing direction.

Where the image shooting angle relative to the viewing angle is set in this way, when wide-angle image shooting and viewing are performed, a small change in the viewing direction results in a large change in the image shooting direction of the camera system, and the target object may be located quickly and easily. Conversely, when narrow-angle image shooting and viewing are performed, the change in the image shooting direction is smaller than the change in the viewing direction, and the image shooting range may be changed without losing sight of the target object.

Figure 10:
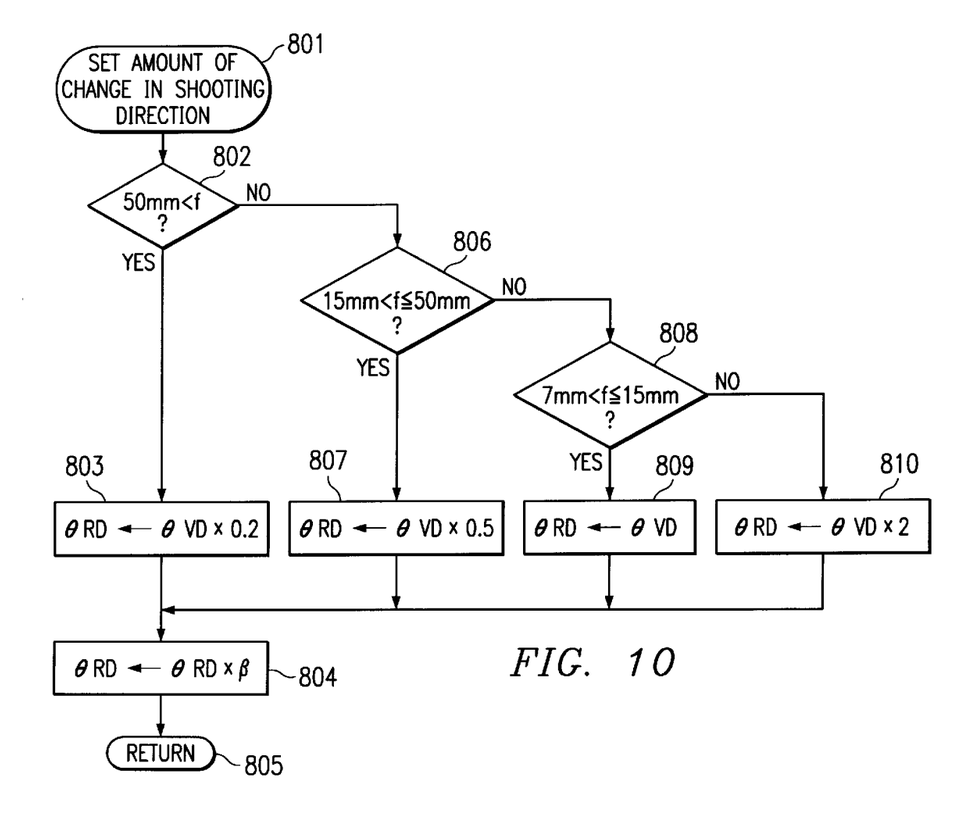
FIG. 10 is a flow chart showing the sequence performed by the controller located in the HMD to carry out setting of the image shooting direction of the three-dimensional camera system.

Next, the routine to set the amount of change in the camera system's image shooting direction by means of the controller will be explained based on the flow chart shown in FIG. 10. When the main routine is begun in step #801 (the word "step" will hereinafter be omitted), it is first determined whether focal length f of the camera system's zoom lens systems is longer than 50 mm (#802). If it is longer than 50 mm, that means that narrow-angle image shooting is being performed, and the amount of change $\theta RD$ in the camera system's direction of image shooting is set in #803 to be 0.2 times amount of change $\theta VD$ in the viewing direction, so that the cameras will move as little as possible. Then in #804, the result is multiplied by sensitivity coefficient $\beta$ set by means of sensitivity setting lever 213 located on the HMD main unit, and this amount is set as the final amount of change in the image shooting direction, whereupon the process returns to the main routine (#805).

On the other hand, where it is determined in #802 that the focal length equals or is shorter than 50 mm, the process advances to #806, wherein it is determined whether the focal length is longer than 15 mm. If the focal length is longer than 15 mm, the process advances to #807 and the amount of change in the image shooting direction is set to be 0.5 times the amount of change in the viewing direction. The process then proceeds to #804. If the focal length equals or is shorter than 15 mm, the process advances to #808, wherein it is determined whether the focal length is longer than 7 mm. If it is longer than 7 mm, the amount of change in the image shooting direction is set in #809 to be equal to the amount of change in the viewing direction, and the process advances to #804. If it is determined in #808 that the focal length equals or is shorter than 7 mm, that means that viewing of the widest possible range is being performed, and therefore the amount of change in the image shooting direction is set in #810 to be twice the amount of change in the viewing direction, so that the cameras will move as much as possible. The process then advances to #804.

Figure 11:
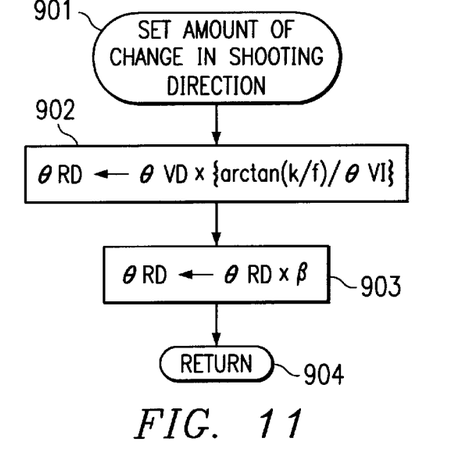
FIG. 11 is a flow chart showing another embodiment of the sequence carried out by the controller.

Next, another embodiment for setting the amount of change in the image shooting direction will be explained with reference to FIG. 11. In this embodiment, the amount of change in the camera system's image shooting direction is set such that the amount of change in the viewed image will be constant regardless of the image magnification.

The magnification of the viewed image is deemed the ratio of viewing angle $\theta VI$ of the HMD and image shooting angle $\theta RI$ of the camera system ($\theta VI/\theta RI$), and amount of change $\theta RD$ in the camera system's image shooting direction is set to be equal to the amount of change $\theta VD$ in the viewing direction ($\theta RD \leftarrow \theta VD$). Where the viewing angle is equal to the image shooting angle and the magnification is 1 (according to the ratio described above), the movement of the camera system corresponds precisely to the movement in the viewing direction, and the image viewed in the HMD changes as if one were looking at the actual object. However, if the magnification increases, the change in the viewed image also increases, and conversely, if the magnification decreases, the change in the viewed image decreases.

Therefore, if the amount of change in the viewed image is set at a constant level irrespective of the magnification, eyestrain and disorientation may be reduced without the viewer losing sight of the target object. In order to have the change in the viewed image remain constant regardless of the magnification, the amount of change in the camera system's image shooting direction should be made equal to the amount of change in the viewing direction multiplied by the reciprocal of the magnification. In other words, in #902, the following calculation is performed:

$$\theta RD = \frac{\theta VD}{\theta VI/\theta RI} = \frac{\theta VD \cdot \arctan(k/f)}{\theta VI}$$

Here, 'f' is the focal length of the zoom lens systems of the camera system, and 'k' is a value that varies depending on the size of the CCD. Then in #903, the amount of change in the camera system's image shooting direction is set to be the result of the calculation above multiplied by sensitivity coefficient β set by means of the sensitivity setting lever, whereupon the process returns to the main routine.

Figure 12:
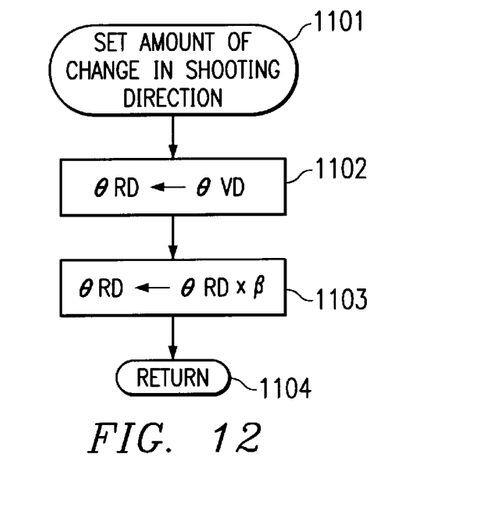
FIG. 12 is a flow chart showing yet another embodiment of the sequence carried out by the controller.

FIG. 12 shows yet another embodiment. In this embodiment, the amount of change in the image shooting direction relative to the viewing direction may only be set manually by the viewer. In #1102, the amount of change in the viewing direction is set as the amount of change in the image shooting direction, and then in #1103, the final amount of change in the image shooting direction is set to be the amount of change in the viewing direction multiplied by sensitivity coefficient β set manually by means of the sensitivity setting lever.

Figure 13:
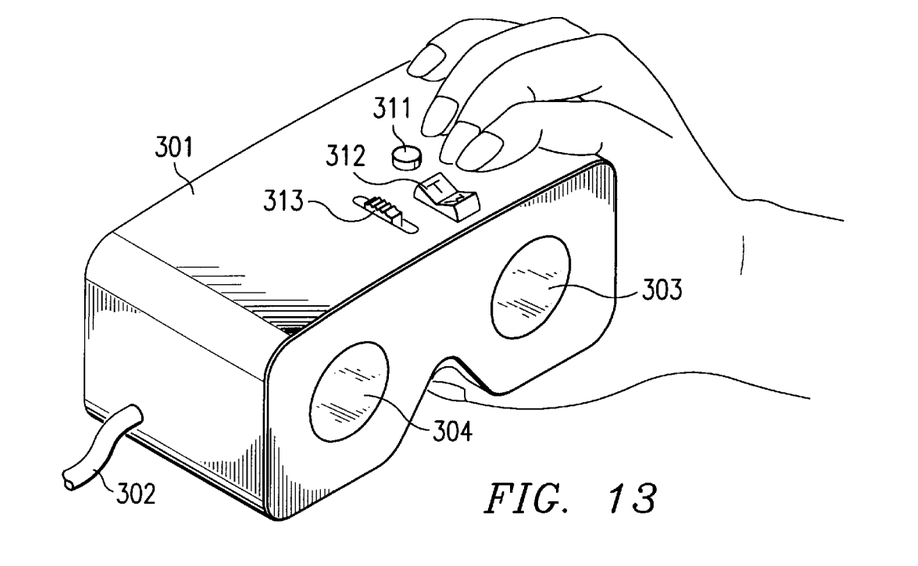
FIG. 13 is a perspective view showing the external construction of another image display device used in the image viewing system.

The HMD used in this image viewing system is not limited to the device described above. For example, the device in FIG. 13 is not of a head-mounted configuration, but is one in which the viewer views the image while holding the device by hand in front of his eyes. Here, main unit 301 is held in the hand and the image may be viewed by peering into eyepieces 303 and 304. For operation members, this embodiment is equipped with startup button 311 to start operation of the device, zoom button 312 to change the focal length of the zoom lens systems of the three-dimensional camera system, and sensitivity setting lever to adjust the sensitivity of the amount of change in the image shooting direction of the three-dimensional camera system. The internal construction is identical to the internal construction shown in FIG. 4. The viewed image, information regarding the viewing direction and information regarding the operation members are transmitted between the HMD and the camera system via cable 302. In addition, if the operation members are mounted on a remote controller separate from the HMD such that operation of these members can be performed via the remote controller, said operation can be more easily performed regardless of the viewing direction.

A three-dimensional camera system is used as the camera system of the embodiments explained above, but a regular two-dimensional camera system may be used instead. An electrical zooming process may be used as a zooming function of the camera. The HMD may also be of a configuration in which images on a single display element are viewed by both eyes, or of a configuration in which viewing is performed using one eye. In addition, transmission of the signals between the camera system and the HMD is performed using a cable in these embodiments, but it may be performed using telephone circuitry or through wireless transmission, allowing viewing of images in remote locations. Moreover, the viewed image is not limited to that shot by a camera system. Viewing may be performed of an image that is generated through computer graphics by connecting the HMD to a computer.

As explained above, in the image viewing systems explained in these embodiments, the direction in which the viewer is viewing the object is detected, an image shooting direction is set in response to said viewing direction and the image corresponding to said image shooting direction is displayed, and the sensitivity when the image shooting direction is set with reference to the viewing direction may be changed by a changing means. Therefore, an appropriate amount of change may be set for the image displayed with reference to the change in the viewing direction, and an image viewing system may be provided in which not only are the viewer's eyestrain and disorientation reduced, but also in which the viewer does not lose sight of the target object and which allows easy image viewing.

Obviously, many modifications and variation of the present invention are possible in light of the above teachings. It is therefore to be understood that within the scope of the appended claims, the invention may be practiced other than as specifically described.

What is claimed is:

1. An image viewing system that displays an image that corresponds to a direction in which a viewer is looking, comprising:
   a display device that displays the image;
   a viewing direction detector that detects the direction in which the viewer is looking;
   a display direction setting device that sets a display direction in accordance with the direction detected by said viewing direction detector;
   an image generator that outputs the image for the set display direction to the display device; and
   a changing device that changes sensitivity when the display direction is set by said display direction setting device.

2. An image viewing system as claimed in claim 1, wherein said changing device changes said sensitivity responsive to manual operation of said changing device.

3. An image viewing system as claimed in claim 1, further comprising a magnification setting device which sets a magnification of the image output from said image generator.

4. An image viewing system as claimed in claim 3, wherein said changing device changes the sensitivity in accordance with the set magnification.

5. An image viewing system as claimed in claim 4, wherein said changing device changes the sensitivity to a lower value in response to an increase in said magnification and to a higher value in response to a decrease in said magnification.

6. An image viewing system as claimed in claim 3, wherein said display direction setting device sets a change in display direction in accordance with a change in direction detected by said viewing direction detector independent of said magnification.

7. An image viewing system as claimed in claim 3, wherein said magnification setting device includes a zooming function.

8. An image viewing system as claimed in claim 1, wherein said image generator includes a camera.

9. An image display device that displays an image that corresponds to a direction in which a viewer is looking, comprising:

a display device that displays the image;

a viewing direction detector that detects the direction in which the viewer is looking;

a display direction setting device that sets an image display direction so that the image pertaining to an image shooting direction, corresponding to said detected direction, is displayed on the display device; and a changing device that changes a sensitivity responsive to the image display direction being set by said display direction setting device.

10. An image display device as claimed in claim 9, wherein said changing device changes said sensitivity responsive to manual operation of said changing device.

11. An image display device as claimed in claim 9, further comprising a magnification setting device which sets a magnification of the image to be displayed.

12. An image display device as claimed in claim 11, wherein said changing device changes the sensitivity in accordance with the set magnification.

13. An image display device as claimed in claim 12, wherein said changing device changes the sensitivity to a lower value in response to an increase in said magnification and changes the sensitivity to a higher value in response to a decrease in said magnification.

14. An image display device as claimed in claim 11, wherein said display direction setting device sets a change in image display direction in accordance with a change in direction detected by said viewing direction detector independent of said magnification.

15. An image display device as claimed in claim 11, wherein said magnification setting device includes a zooming function.

16. An image display device as claimed in claim 9, wherein said image display device cooperates with an image generator that outputs the image.

17. An image display method comprising the steps of:

detecting a direction in which a viewer is looking;

setting a sensitivity, of the step of detecting, based on predetermined information;

generating an image corresponding to the detected direction; and displaying the thus generated image.

18. An image display method as claimed in claim 17, wherein said predetermined information includes a magnification of the displayed image.

19. An image display method as claimed in claim 18, wherein said step of setting a sensitivity sets a lower sensitivity in response to an increase in said magnification and sets a higher sensitivity in response to a decrease in said magnification.

20. An image viewing system that displays an image that corresponds to a direction in which a viewer is looking, comprising:

a display device that displays the image;

an image generator that is movable within a range of motion and observes an object in a selected direction within the range of motion and outputs the image of the object observed to said display device;

a viewing direction detector that detects movement as the viewer looks from an initial location to a final location;

a display direction setting device that moves the selected direction of the image generator in accordance with the movement detected by said viewing direction detector, a ratio of the movement detected by the viewing direction detector and the movement directed by the display direction setting device being a constant; and a changing device that changes a value of the constant.

21. An image viewing system as claimed in claim 20 wherein the changing device changes said sensitivity responsive to manual operation of the changing device.

22. An image viewing system as claimed in claim 20 wherein the image generator includes a magnifying system, the constant being set relative to a magnification of the image output from the image generator.

23. An image viewing system as claimed in claim 22 wherein the changing device changes the constant to a lower value in response to an increase in the magnification and to a higher value in response to a decrease in the magnification.

24. An image viewing system as claimed in claim 20 wherein the image generator includes a left camera taking a left image and a right camera taking a right image of the object, said display device having a left display and a right display to display the image from the left camera and right camera, respectively.

25. An image viewing system as claimed in claim 20 wherein the movement detected by the viewing direction detector is through an angle $\theta VD$, the display direction setting device correspondingly changes the selected direction of the image generator through an angle $\theta RD$.

26. An image viewing system as claimed in claim 20 wherein the image generator is a camera having a focal length f, the constant being 0.2 if the focal length is greater than 50 mm, 0.5 if the focal length is greater than 15 mm but less than or equal to 50 mm, 1.0 if the focal length is greater than 7 mm but less than or equal to 15 mm and 2.0 if the focal length is less than or equal to 7 mm.

27. An image viewing system as claimed in claim 25 wherein the following equation applies:

$$\theta RD = [\theta VD \times \arctan(k/f)] \theta VI$$

where f is a focal length of the image generator, $\theta VI$ is the viewing angle of the viewer, and k is a value dependent on the image generator.

28. An image viewing system as claimed in claim 20 wherein the viewing direction detector includes a piezoelectric vibration gyroscope.

* * * * *